Jan. 2, 1934.  V. W. G. KEMP  1,942,248
CONTAINER FOR ADHESIVE AND THE LIKE
Filed Feb. 19, 1931
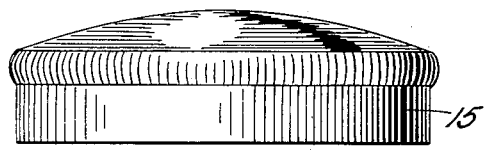
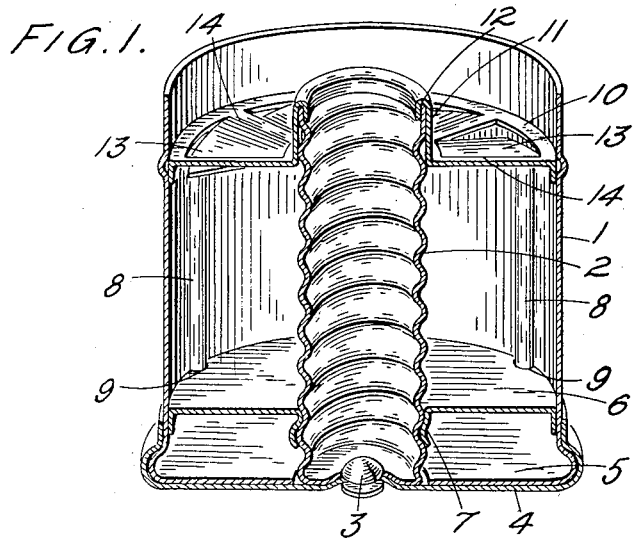
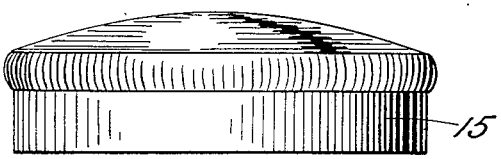
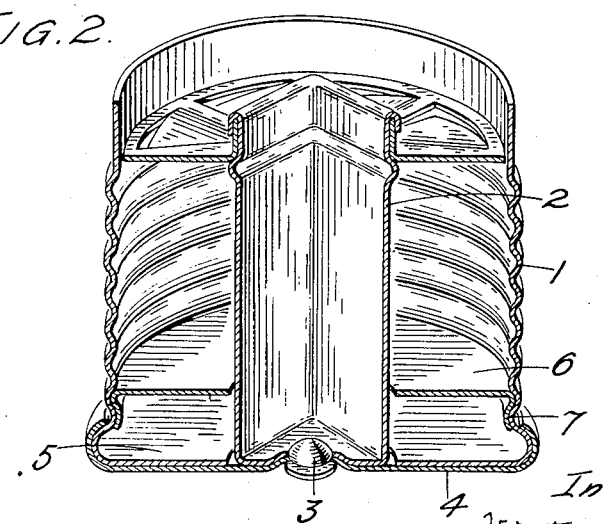
Inventor,
Victor W. G. Kemp
Per,
Hubert E. Peck  Atty.

Patented Jan. 2, 1934

1,942,248

UNITED STATES PATENT OFFICE 1,942,248

CONTAINER FOR ADHESIVE AND THE LIKE

Victor William George Kemp, Grove Park, England

Application February 19, 1931, Serial No. 517,045, and in Great Britain August 14, 1930

5 Claims. (Cl. 91—67.1)

This invention relates to paste pots. When a stiff paste is used from a pot of the kind having a central tube to contain the brush and the paste is a hollow cylindrical mass surrounding said tube, there is a tendency to wipe the paste on its centre line and to leave the portions at the sides adjacent the wall of the pot and the wall of the tube, which portions become hard and useless. Further as the paste is used towards the bottom of the pot it is difficult to employ a short brush such as may be accommodated in the central tube. The present invention has for object to overcome these and other disadvantages.

Specific forms of the invention will now be described, by way of example, with reference to the accompanying drawing wherein:—

Fig. 1 is a section in perspective view, partly in section, of one form, and

Fig. 2 is a similar view of a second form.

Like references refer to like parts throughout the drawing.

Referring to Fig. 1, the container 1 is circular and has at the centre a tube 2 which is so formed that its surface is a screw thread extending from the top to the bottom thereof. Said tube is secured by a rivet 3 to a false bottom 4 consisting of a dished plate mounted on the bottom 5 of the container and rotatable thereon. An annular plate 6 surrounds the central tube 2 and extends to the wall 1 of the container. Said plate has at its inner edge a threaded flange 7 which engages the threaded surface of the tubular member 2 so that on rotating the latter the threaded flange 7 is caused to traverse the tube 2 and the plate 6 to move towards one end or the other of the container 1. It is necessary to prevent rotation of the plate in relation to the container 1 and this is attained by providing longitudinal inward projections 8 in the wall of the container 1 which projections engage slots or depressions 9 in the edge of the plate 6. An annular plate or grid 10 encircles and is mounted on the tube 2 at its upper end. The inner edge of said plate is turned upwards to form a wall 11 which at its upper edge is turned over the upper end of the tube 2 as shown at 12.

The annular plate 10 has parts 13 cut out and bent slightly downwards about one of their edges as shown at 14 to constitute cutting members.

The plate 6 being at the bottom the container 1 is filled with adhesive through a hole (not shown) in the plate 10 and when it is required to use such adhesive, the false bottom 4 is rotated and with it the tube 2. The plate 6 and with it the adhesive is thus forced upwards. At the same time the plate 10 is rotated and the surface of the adhesive is removed by the parts 13 and passed to the upper side of the plate, whence it may be removed by a brush. The central tube 2 constitutes a receptacle for storing the brush. When it is required to refill the container the false bottom 4 is rotated to move the plate 6 to the bottom and fresh adhesive is supplied through the hole not shown. 15 is the lid which fits in the usual way over the upper end of the container 1.

Referring now to Fig. 2, the plate 6 has a threaded flange 7 at its outer edge which engages the threaded surface of the circular container 1. The inner edge of the plate is of a shape to engage the central tube 2 which, in the example shown, is of square section. When the false bottom 4 is rotated the tube 2 is consequently rotated and carries round the plate 6 which is caused to traverse from the bottom to the top of the container 1 to carry with it the adhesive as described in connection with Fig. 1.

It will be understood that a similar movement occurs if the central tube 2 is held stationary and the container 1 is rotated about it.

Various modifications may be made without departing from the invention. For example, instead of the annular plate 10 having parts 13 which are bent downwards to remove the adhesive when the central tube is rotated, the plate 10 may have apertures through which the adhesive is forced. This arrangement, however, is not so satisfactory in that it is found that considerable force is necessary to cause the adhesive to be extruded through said apertures. If the plate 10 is not to be rotated other means of mounting it may be provided.

In the arrangement shown in Fig. 2 the central tube may be circular and provided with projections, for example, similar to the projections 8 in the wall of the container 1 of Fig. 1, such projections engaging slots or depressions in the inner edge of the plate 6.

The central tube 2 may be of other shape than square, for example, it may be triangular, hexagonal or other shape and engage similar shaped holes in the plate 6 so that the latter is carried round when the tube is rotated.

In the form of the invention illustrated in Fig. 1 the container may be of other shape than cylindrical and the threaded tube need not be centrally arranged. In any case, however, the tube must be adapted for accommodating the brush for applying the adhesive.

What I claim is:

1. Paste-pot comprising a tubular inner container for the paste brush, an annular outer container for the paste, an annular apertured plate mounted in said outer container in such manner as to partition off an upper annular space, a second annular plate in said outer container, and means for moving said second plate from the bottom of the outer container towards the apertured plate, whereby paste in said outer container can be forced through the last named plate into the upper space when it can be removed by said brush.

2. Paste-pot comprising a tubular inner brush-container with an external thread, an annular outer paste-container, an annular apertured plate mounted in said outer container in such manner as to partition off an upper annular space, a second annular plate arranged in said outer container and having an internal thread to engage the external thread on the inner container, a false pot-bottom secured to said inner container for rotating the same, and means engaging between the second annular plate and outer-container for preventing relative rotation whilst permitting relative axial movement.

3. Paste-pot comprising a tubular inner brush-container, an annular outer paste-container with an internal thread, an annular plate arranged in said outer container and having an external thread to engage the internal thread on the outer container, and a false pot-bottom secured to the inner container for rotating the same together with the annular plate, said tubular container being made of prismatic shape so that the annular plate is incapable of rotation although capable of axial movement in relation thereto.

4. Paste-pot comprising a rotatable inner container for the paste brush, an annular outer container for the paste, an annular plate in said outer container, means for feeding said plate upwardly therein, and a paste-removing grid mounted on the inner container for rotation therewith and below the level of the top of the outer container thereby partitioning off an annular space in the upper part of the latter, which space serves to receive the paste removed by said grid.

5. Paste pot comprising a tubular inner container for the paste brush, an annular outer container for the paste, an annular plate in said outer container, screw-thread means for traversing said plate axially of said outer container by rotation of said inner container, an apertured annular plate mounted on said inner container to rotate therewith in the outer container, such apertured plate being disposed below the top of the outer container so as to form an upper annular space therein, and paste removing parts carried by said apertured plate, rotation of the inner container thereby serving by the one operation and at the same time to traverse the first-named annular plate and to rotate the apertured plate and its paste removing parts, so that paste is transferred from said outer container to said upper space.

VICTOR WILLIAM GEORGE KEMP.